United States Patent [19]

Runnels et al.

[11] 3,752,422

[45] Aug. 14, 1973

[54] JET AUGMENTED RAM AIR SCOOP

[75] Inventors: Joe N. Runnels, Bellevue, Wash.; Svend Strandbygaard, North Glenn, Colo.

[73] Assignee: The Boeing Company, Seattle, Wash.

[22] Filed: June 30, 1971

[21] Appl. No.: 158,282

[52] U.S. Cl............................ 244/118 R, 244/53 B
[51] Int. Cl............................................. B64d 13/06
[58] Field of Search..................... 244/118 R, 118 P, 244/59, 53 B; 62/DIG. 5, 402; 98/1, 1.5; 165/15

[56] References Cited
UNITED STATES PATENTS

| | | | |
|---|---|---|---|
| 2,327,737 | 8/1943 | Pendergast | 244/118 P |
| 2,721,715 | 10/1955 | Hoadley | 244/53 B |
| 2,869,535 | 1/1959 | Horrell | 244/118 P |
| 3,446,223 | 5/1969 | Hancock | 244/53 B |
| 2,898,745 | 8/1959 | Weisel | 98/1.5 X |
| 3,097,504 | 7/1963 | Quick et al. | 62/402 X |
| 3,265,331 | 8/1966 | Miles | 244/53 B |
| 3,630,138 | 12/1971 | Marcussen et al. | 98/1.5 |

*Primary Examiner*—Milton Buchler
*Assistant Examiner*—Barry L. Kelmachter
*Attorney*—Brown, Murray, Flick & Peckham

[57] ABSTRACT

Ram air scoop system, particularly adapted for use in aircraft, wherein cabin air from the interior of the aircraft is fed as a high velocity jet into the scoop and passed through a heat exchanger for the cabin air-conditioning system. This has the effect of improving the aerodynamic efficiency of the scoop by increasing the velocity at the exit of the ram air system in flight, resulting in less drag. While the aircraft is on the ground and air is forced through the scoop by a fan or the like, the cabin air can be at a temperature lower than that of the ambient air, this cooler cabin air acting to increase the efficiency of the heat exchanger.

7 Claims, 2 Drawing Figures

PATENTED AUG 14 1973
3,752,422
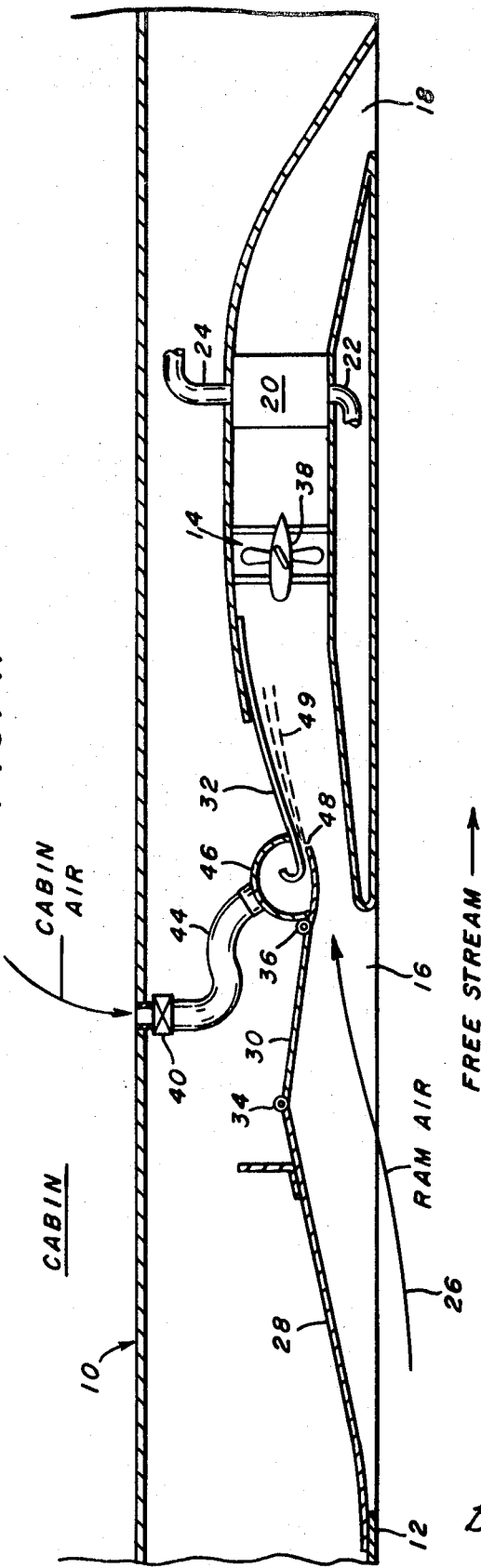
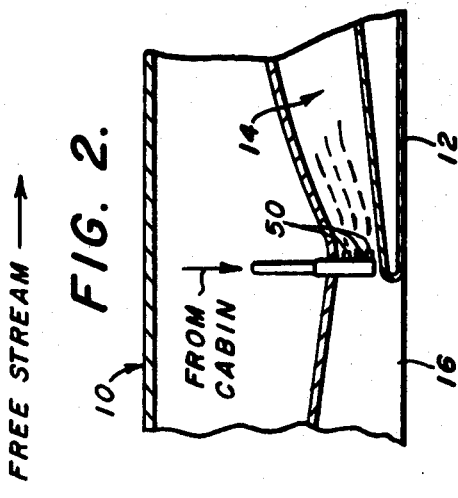
INVENTORS.
JOE N. RUNNELS &
SVEND STRANDBYGAARD
By
*Brown, Murray, Flick + Peckham*
Attorneys

JET AUGMENTED RAM AIR SCOOP

BACKGROUND OF THE INVENTION

Airplane cabin pressurizing systems have been devised which operate on the principle of drawing hot compressed air from the aircraft engine, reducing the pressure and temperature of this compressed air to values suitable for human comfort, and passing the conditioned air through the pressurized cabin at an ample ventilating rate. Such systems are advantageous in their utilization of the existing air compressor which comprises an essential part of the engine. However, the hot bleed air from the engine is at a temperature of approximately 400° F. Consequently, this hot air is initially passed through a heat exchanger disposed within a ram duct having an entrance scoop and an exit nozzle which are usually flush with the aircraft skin. Ram air entering the scoop passes through the heat exchanger and is then exhausted through the exit nozzle, in which process hot bleed air from the engine passing through the heat exchanger is cooled and thereafter passed to further heat exchangers in the aircraft air-conditioning system. In most conventional systems of this type, the cabin air, after it circulates within the cabin, is discharged directly overboard through cabin pressure control valves.

SUMMARY OF THE INVENTION

In accordance with the present invention, the aerodynamic efficiency of a ram air scoop of the type described above is improved, resulting in less drag on the aircraft. This is achieved by discharging cabin air (which is at a higher pressure than the ambient air during flight) into the ram air scoop as a high velocity jet. Preferably, the air is discharged into the ram air scoop as a high velocity jet which travels along a wall or boundary of the scoop to achieve boundary layer control action, giving higher exit plane velocities and, therefore, less drag. In addition, the required quantity of ambient ram air is reduced because of the use of cabin air. This means that the duct system can be designed to reduce the quantity of ambient air taken in with a resulting lower drag effect.

While the aircraft is on the ground and the cabin is unpressurized, a powered fan, which is usually located in the ram air duct, draws ambient air through the scoop inlet to cool pressurized air passing through the aforesaid heat exchanger. Discharging cabin air into the ram duct during these conditions increases the efficiency of the heat exchanger, particularly during hot weather conditions. That is, during hot day ground cooling, the ambient air temperature may be 100° F or higher, while the cabin air temperature is approximately 75° F. The use of cabin air in the ram air system, therefore, increases the air-conditioning cooling capability on the ground.

The above and other objects and features of the invention will become apparent from the following detailed description taken in connnection with the accompanying drawings which form a part of this specification, and in which:

FIG. 1 is a cross-sectional view of one embodiment of the invention wherein boundary layer control is utilized to improve the aerodynamic efficiency of the ram air scoop of the invention; and FIG. 2 is a cross-sectional view of another embodiment of the invention wherein jet nozzles disposed across the width of a scoop are utilized to improve the aerodynamic efficiency of the ram air scoop system.

With reference now to the drawings, and particularly to FIG. 1, the reference numeral 10 indicates the wall or boundary of a pressurized aircraft cabin while the reference numeral 12 represents the outer skin of the aircraft. Disposed between the cabin wall 10 and the aircraft skin 12 is a ram air duct 14 having an inlet scoop 16 flush with the aircraft skin 12 and a ram air exit nozzle 18, also flush with the skin of the aircraft. The ram air duct is preferably located in the wing-body fairing of the aircraft; however, other locations on the skin of the aircraft may be used, depending upon design requirements.

Disposed within the ram air duct 14 is a heat exchanger, generally indicated by the reference numeral 20, having an inlet conduit 22 adapted for connection to a source of hot bleed air from the aircraft engine and an exit nozzle 24 adapted for connection to an air-conditioning pack, not shown.

The basic function of the ram air scoop system is to provide cooling air for the heat exchanger 20 which reduces the temperature of the hot bleed air passing into the exchanger via conduit 22 from approximately 400° F to 250° F prior to use in the cabin air-conditioning unit. While the aircraft is in flight, ram air, indicated schematically by the arrow 26, enters the intake scoop 16 and flows through the heat exchanger 20 to the exit nozzle 18 where it is discharged. The quantity of intake air can be controlled by adjusting the area of the exit nozzle 18 by a mechanism, not shown, responsive to the air-conditioning pack controls. At the same time, the shape of the inlet end of the ram air duct 14 is changed to maintain flow stability in the scoop. In this respect, it will be noted that the upper wall of the scoop, at the forward end of the duct 14, is formed from three portions 28, 30 and 32, the portion 30 being hinged at its opposite ends 34 and 36 to the portions 28 and 32. The opposite end of portion 28, in turn, slides on the inner surface of the aircraft skin 12; while the undersurface of the portion 32 slides on the undersurface of the top of the main portion of the duct 14. Suitable mechanical means, not shown, may be utilized to move the portion 30 upwardly or downwardly to thereby vary the inlet area of the ram air scoop 16 to the duct 14, in which process the portion 30 pivots about the hinges at 34 and 36.

Disposed within the duct 14 is a fan 38 which is utilized while the aircraft is on the ground to force ambient air through the heat exchanger 20. While the aircraft is in flight, however, the fan 38 is not used, and ram air flows into the duct 14.

As was explained above, it is necessary, in a pressurized aircraft cabin, to discharge pressurized air overboard in order to maintain the circulation of air through the cabin. In accordance with the present invention, this pressurized cabin air is utilized to improve the aerodynamic characteristics of the ram air scoop system shown in FIG. 1. Specifically, cabin air flows through a valve 40 and conduit 44 to a plenum chamber 46 and then through a fixed geometry nozzle 48. In the embodiment of FIG. 1, the nozzle 48 creates a high velocity jet 49 along the upper surface of the ram air duct 14, thereby removing a portion of the boundary layer which exists and reducing the drag of the ram air scoop. That is, the increased pressures at the intake duct give more velocity in the ram air system exhaust exit plane; and, therefore, less net drag is created by the system. At the same time, improved aerodynamic efficiency is achieved by virtue of the boundary layer control action to give higher exit plane velocities and less drag. A further drag reduction is achieved by using cabin air as part of the required heat sink. That is, the quantity of outside air (i.e., ram air) is reduced.

During ground operation when the cabin is unpressurized, the powered fan 38 located within the ram air duct draws ambient air through the scoop inlet 16 and cabin air through the nozzle 48 to cool the pressurized air passing through the heat exchanger 20. During hot day ground cooling, the ambient air temperature may be as high as approximately 100° F while the cabin air temperature is approximately 75° F. Thus, the use of cabin air in the ram air circuit increases the air-conditioning cooling capability on the ground since the air passing through the heat exchanger during these conditions is cooler than it otherwise would be.

In FIG. 2, another embodiment of the invention is shown which is similar to that of FIG. 1 except that in this case the cabin air enters the duct 14 through a plurality of nozzles 50 more or less centrally located within the duct. This has the effect of increasing the pressure at the duct exit plane, but does not necessarily improve boundary layer conditions.

Although the invention has been shown in connection with certain specific embodiments, it will be readily apparent to those skilled in the art that various changes in form and arrangement of parts may be made to suit requirements without departing from the spirit and scope of the invention.

We claim:

1. A ram air scoop system for an aircraft having a pressurized cabin comprising a ram air duct having an inlet opening through which ram air enters the duct and an exit nozzle through which ram air leaves the duct, heat exchanger means disposed within the duct, conduit means connecting the interior of the pressurized cabin with the duct and nozzle means opening into the duct connected with the conduit means for injecting cabin air into the duct to thereby improve aerodynamic efficiency of the ram air scoop system and reduce the drag on said aircraft due to said ram air scoop system.

2. The system of claim 1 wherein said nozzle means is disposed within said duct to create an air jet adjacent a wall of the duct, thereby improving its boundary layer conditions.

3. The system of claim 1 including a plenum chamber interposed between said nozzle means and the conduit means connecting the interior of said pressurized cabin, with the duct, and valve means in said conduit means.

4. The system of claim 1 wherein said nozzle means is disposed essentially centrally within said ram air duct.

5. The ram air scoop system of claim 1 including in an inner wall of the scoop at its inlet opening three movable wall portions two of which are outer portions and the third of which is a center portion intermediate the outer portions and means hinging each outer portion to its adjacent end of the center portion, the end of one outer portion opposite the center portion being adapted to slide along the inner surface of the aircraft skin and the end of the other outer portion being slidable along the underface of the top of the ram air duct so that movement of the center panel toward or away from the aircraft skin varies the inlet area of the ram air scoop.

6. The ram air scoop system of claim 5 in which the nozzle means are positioned adjacent to the hinging means between the center moveable wall portion and the outer portion sliding on the underface of the top of the ram air duct.

7. The ram air scoop system of claim 5 including a plenum chamber connected between the conduit means and the nozzle means, the plenum chamber being positioned adjacent to the hinging means between the center moveable wall portion and the outer portion sliding on the underface of the top of the ram air duct.

* * * * *